United States Patent [19]

Adams et al.

[11] Patent Number: 5,049,624
[45] Date of Patent: Sep. 17, 1991

[54] PACKAGING

[75] Inventors: John F. Adams, Caversham; Michael A. Cochran, Wantage; Rickworth Folland, Faringdon; James W. Nicholas; Melvin E. R. Robinson, both of Wantage, all of England

[73] Assignee: CMB Foodcan plc, Worcester, England

[21] Appl. No.: 435,404

[22] PCT Filed: Mar. 10, 1989

[86] PCT No.: PCT/GB89/00243

§ 371 Date: Nov. 1, 1989

§ 102(e) Date: Nov. 1, 1989

[87] PCT Pub. No.: WO89/08557

PCT Pub. Date: Sep. 21, 1989

Related U.S. Application Data

[63] Continuation-in-part of Ser. No. 340,416, Mar. 23, 1989.

[30] Foreign Application Priority Data

Mar. 12, 1988 [GB] United Kingdom ................ 8805931
Mar. 22, 1988 [GB] United Kingdom ................ 8806752
Jul. 1, 1988 [GB] United Kingdom ................ 8815699
Jan. 27, 1989 [GB] United Kingdom ................ 8901761

[51] Int. Cl.$^5$ .................. C08K 5/00; C08K 5/20; B32B 27/18; B65D 81/26
[52] U.S. Cl. ................ 525/371; 252/186.24; 252/186.25; 252/186.33; 252/188.28; 252/383; 252/385; 428/483; 428/36.6; 428/35.9; 428/219; 428/332
[58] Field of Search ............ 525/371; 252/186.24, 252/186.25, 186.33, 188.28, 383, 385; 428/483, 36.6, 35.9, 219, 332

[56] References Cited

U.S. PATENT DOCUMENTS 3,586,514 6/1971 Vijlbrief.
4,041,209 8/1977 Scholle.
4,048,361 9/1977 Valyi.

FOREIGN PATENT DOCUMENTS 0083826 7/1983 European Pat. Off.
WO90/00504 1/1990 PCT Int'l Appl.
WO90/00578 1/1990 PCT Int'l Appl.
1582296 1/1981 United Kingdom.
1582463 1/1981 United Kingdom.
2119741 11/1983 United Kingdom.

OTHER PUBLICATIONS

Chemical Abstracts, vol. 100, p. 60, 193165x.

Primary Examiner—Paul R. Michl
Assistant Examiner—T. McDonald, Jr.
Attorney, Agent, or Firm—Burns, Doane, Swecker & Mathis

[57] ABSTRACT

The present invention provides a wall for a package comprising: (a) an outer set of one or more layers (1-4) and (b) an inner set of one or more layers (5-6) which layer or the outermost of which layers (5) comprises a composition comprising a polymer and having oxygen-scavenging properties, wherein (i) the outer set of layers would have, if separate from the inner set and in the absence of any oxygen-scavenging properties in any of the layers or the layer constituting the set, a permeance, for oxygen, of not more than 1.5 cm$^3$/(m$^2$ atm day); (ii) the inner set of layers would have, if separate from the outer set and in the absence of oxygen-scavenging properties in any of the layers or the layer constituting the set, a permeance, for oxygen, of at least 2.0 cm$^3$/(m$^2$ atm day); and (iii) the inner set of layers would have, if separate from the outer set, a permeance, for oxygen, less than the permeance specified in (ii) by at least 1.0 cm$^3$/(m$^2$ atm day) by virtue of oxygen-scavenging in at least the layer specified in (b). In a preferred combination one of the outer layers (3) is of metal and the composition in the outermost of the inner layers (5) scavenges oxygen through the metal-catalyzed oxidation of an oxidizable organic component thereof. The wall is suitable for packaging uses, with the inner set of layers disposed towards the product, where headspace scavenging is especially desired.

11 Claims, 3 Drawing Sheets

|———| 200μm

PACKAGING

CROSS-REFERENCE TO RELATED APPLICATION

This is a continuation-in-part of application Ser. No. 07/340,416, filed Mar. 23, 1989.

FIELD OF INVENTION

The present invention relates to packaging of oxygen-sensitive foods and beverages.

BACKGROUND OF INVENTION

Among substances that are oxygen-sensitive we would particularly mention beers (especially lager beers), wines (especially white ones), fruit juices, some carbonated soft drinks, fruits, nuts, vegetables, meat products, baby foods, coffee, sauces, and dairy products. Almost all foods and beverages are sensitive to some degree.

One approach to oxygen-sensitive products has been the inclusion in the pack of a sachet containing a compound such as iron or a lower iron oxide or hydroxide. This material reacts with ("scavenges") oxygen packed with the product or transmitted through the wall of the package.

Another approach has been the inclusion of scavenger in the walls of the package. Where the walls comprise a polymer and are appreciably oxygen-permeable this has the advantage of scavenging at least a part of the oxygen before it reaches the package contents at all.

Some discussion of the conventional measurements and units of oxygen permeation is appropriate at this point. The measurement is made by exposing a package wall of area A to a partial pressure p of oxygen on the one side and to an essentially zero partial pressure of oxygen on the other. The quantity of oxygen emerging on the latter side is measured and expressed as a volume rate dV/dt, the volume being converted to some standard conditions of temperature and pressure. After a certain time of exposure (usually a few days) dV/dt is generally found to stabilise, and a $P_W$ value is calculated from the equation (1).

$$dV/dt = P_W A p \quad (1)$$

$P_W$ in the present specification and claims is called the permeance of the wall. (Analogy with magnetic permeance and electrical conductance would suggest that $P_W$ should be described as "permeance per unit area", but we are following the nomenclature in Encyclopaedia of Polymer Science and Technology, Vol. 2, Wiley Interscience, 1985, page 178.) The standard conditions for expressing dV/dt used generally and in this specification are 0° C. and 1 atm (1 atm = 101 325 N m$^{-2}$). If the thickness of the area of wall is substantially constant over the area A with value T and the wall is uniform through the thickness (i.e. the wall is not a laminated or coated one) then the permeability of the material in the direction normal to the wall is calculated from the equation (2).

$$dV/dt = P_M A p / T \quad (2)$$

For non-scavenging materials, $P_W$ and $P_M$ are to a reasonable approximation independent of t, p, and T although they are often appreciably dependent on other conditions of the measurement such as the humidity of the atmosphere on the oxygen-rich side and the temperature of the measurement.

For oxygen-scavenging walls, $P_W$ and $P_M$ are functions of t because the concentrations and activity of scavenger vary with time (particularly as the scavenger is consumed). This has not prevented us usually from measuring $P_W$ and $P_M$ reasonably accurately as a function of time (the changes in dV/dt being relatively gradual once the normal initial equilibration period of a few days is over). However, it should be recognised that, whereas after a few days' exposure to the measurement conditions a non-scavenging wall achieves a steady state in which dV/dt is equal to the rate of oxygen ingress to the wall, a scavenging wall achieves an (almost) steady state in which dV/dt is considerably less than the rate of oxygen ingress to the wall. This being the case, it is likely that $P_W$ calculated from (1) is a function of p as well as of t and that $P_M$ in (2) is a function of p and T as well as of t. $P_W$ and $P_M$ for scavenging walls are, strictly speaking, not true permeances and permeabilities at all (since permeation and scavenging are occurring simultaneously) but, rather, apparent ones. However, we have chosen to retain the conventional terms "permeance" and "permeability". So long as the conditions of the measurement are sufficiently specified they are suitable for characterising the walls in a manner relevant to the packaging user (i.e. in terms of the oxygen emerging from the wall).

All values of $P_W$ and $P_M$ hereinafter in this specification (except where stated otherwise) are to be understood to refer to conditions in which p=0.21 atm, the relative humidity on the oxygen-rich side of the wall is 50% and the temperature is 23° C. Conditions close to these are conventional in the packaging industry.

It is possible for $P_W$ and $P_M$ to be affected by the illumination of the wall under test. All $P_W$ and $P_M$ values hereinafter, and indeed all references to oxidation, oxidisability, and oxygen-scavenging properties, refer to the dark or else to conditions of irradiation not appreciably contributing to oxygen-scavenging.

In our copending UK patent application 88 15699.7, we have described and claimed a wall for a package, which wall comprises, or includes a layer comprising, a composition comprising a polymer and having oxygen-scavenging properties, characterised in that the composition scavenges oxygen through the metal-catalysed oxidation of an oxidisable organic component thereof.

In a second aspect, the invention of the aforesaid UK patent application provides a composition for packaging use which comprises a polymer, an oxidisable organic component, and a metal catalyst for the oxidation of the oxidisable organic component.

The composition provided by the aforesaid invention has three major uses, namely as the material for a wall or a layer of a wall, as a masterbatch for blending with another polymer for such use, and as a head-space scavenger.

In a third aspect the aforesaid invention provides a package, whether rigid, semi-rigid, collapsible, lidded or flexible or a combination of these, a wall of which is a wall as provided by the invention in its first aspect or comprises entirely, as a layer, or as a blend the composition provided by the invention in its second aspect.

The UK patent application corresponds to EPC patent application 88 306175.6 and PCT patent application GB/8800532. The UK patent application has been published under number GB 2207439A and the EPC under number EP 301719 A1. The entire disclosure of the aforesaid patent applications is incorporated herein by this reference. However, it is convenient here to note the following points relating to our earlier invention:

(1) The oxidisable organic component may be an oxidisable polymer. The use of an oxidisable polymer as the oxidisable organic component has the advantage, broadly speaking, over the use of an oxidisable non-polymeric component that it is less likely to affect adversely the properties of a non-oxidisable polymer with which is is blended. It is possible for an oxidisable polymer to be used as the sole polymer in the composition, serving a dual function as polymer and oxidisable organic component.

(2) It is of course possible for two or more polymers, two or more oxidisable organic components, or two or more catalysts to be used. It is possible also for a metal catalyst to be used in combination with a non-metal catalyst.

(3) The word "catalyst" is used in a general way readily understood by the man skilled in the art, not necessarily to imply that it is not consumed at all in the oxidation. It is indeed possible that the catalyst may be converted cyclically from one state to another and back again as successive quantities of oxidisable component are consumed by successive quantities of oxygen. However, it may be that some is lost in side reactions, possibly contributing directly to oxygen-scavenging in small measure, or indeed that the "catalyst" is more properly described in an initiator (e.g. generating free radicals which through branching chain reactions lead to the scavenging of oxygen out of proportion to the quantity of "catalyst").

(4) Polyesters and polyolefins are especially suitable as non-oxidisable polymeric components, especially ethylene terephthalate or ethylene naphthalate polyesters. Oxidisable organic components include amides, especially polyamides and most especially MXD6, which is a condensation polymer of m-xylylenediamine and adipic acid. Metal catalysts include cobalt, copper, and rhodium compounds.

The aforesaid patent applications describe most particularly walls which would have a permeance in the range from 1.5, preferably 3.0 to 30, preferably 18.0 $cm^3/(m^2$ atm day), in the absence of scavenging. Various multi-layer structures for walls are also described.

SUMMARY OF INVENTION

The present invention provides a wall comprising
(a) an outer set of one or more layers; and
(b) an inner set of one or more layers, which layer or the outermost of which layers comprises a composition comprising a polymer and having oxygen-scavenging properties,
wherein
(i) the outer set of layers would have, if separate from the inner set, a permeance, for oxygen, of not more than 1.5 $cm^3/(m^2$ atm day);
(ii) the inner set of layers would have, if separate from the outer set and in the absence of oxygen-scavenging properties, a permeance, for oxygen, of at least 2.0 $cm^3/(m^2$ atm day); and
(iii) the inner set of layers would have, if separate from the outer set, a permeance, for oxygen, less than the permeance specified in (ii) by at least 1.0 $cm^3/(m^2$ atm day).

If, as may be the case for instance if a reclaim layer is present, there may be some oxygen scavenging in the outer set of layers, the permeance (i) is in the absence of such scavenging.

In (iii), of course, oxygen-scavenging in the inner set of layers is to be deemed unaffected by the separation from the outer set of layers. If the inner set of layers consists of two or more layers, and one of these (for instance a reclaim layer) is scavenging in addition to the outermost one, then this will of course contribute to the difference specified in (iii).

By "wall for a package" in the present specification and claims is included (except where the context indicates otherwise) not only a wall when incorporated into a package structure but also packaging materials capable of forming walls, such as package bases, packaging sheet, and so on.

In the above "inner", "outer", and "outermost" are understood purely as conventional reference terms (albeit referring to the eventual use of the wall), not referring necessarily to any observable feature of the wall prior to its use. As will be apparent from the usage of these terms hereinafter, the progression from the inside of the wall to the outside is in a constant sense from the one face of the wall to the other (not from the central portion of the wall to the faces in two opposed senses). Accordingly, where the inner set comprises two or more layers, the outermost of these is immediately adjacent to a single layer comprising the outer set (or to the innermost of the layers of the outer set where the outer set comprises two or more layers).

Preferably, the permeance referred to in (i) is less than 1.0 $cm^3/(m^2$ atm day), more preferably less than 0.5 $cm^3/(m^2$ atm day), and above all less than 0.1 $cm^3/(m^2$ atm day).

Advantageously, the permeances referred to in (ii) and (iii) are such that the difference specified in (iii) is at least 2.0 $cm^3/(m^2$ atm day), preferably at least 3.0 $cm^3/(m^2$ atm day), more preferably at least 10.0 $cm^3/(m^2$ atm day), especially at least 30 $cm^3/(m^2$ atm day), and above all at least 100 $cm^3/(m^2$ atm day). The latter four figures are also advantageous, preferred, etc. for the permeance specified in (ii).

The time period for which the difference specified in (iii) is maintainable should be greater the longer is the exposure time prior to filling of the package, the larger is the volume of oxygen likely to be enclosed on filling, and the higher is the permeance specified in (i). In general, however, it would be of interest for this difference to be maintainable (under standard conditions of $p=0.21$ atm, 23° C., and 50% relative humidity) for at least two, preferably at least ten, and especially at least twenty days, and above all at least one hundred days.

An important aspect of the wall provided by the present invention is that, if used for the packaging of an oxygen-sensitive product with the aforesaid inner set of walls disposed towards the product and the outer set towards the atmosphere, it will serve to a very significant degree to scavenge the oxygen packed with the product. Especially if the permeance specified in (i) is less than 0.1 $cm^3/(m^2$ atm day), such scavenging is very likely to preponderate in the short run at least over scavenging of oxygen inwardly transmitted. The relatively high permeability in the absence of scavenging of the materials constituting the inner layers ((ii) above) facilitates the entry of head space oxygen into the inner layers where it is scavenged. The difference (iii) above is a measure of the scavenging power of the inner set of walls. The wall may be rigid, a flexible sheet, or a clinging film.

Before proceeding to discuss the present invention in more detail, it is appropriate to consider how it is possible to determine permeances, especially those referred to in (ii), which are permeances in hypothetical conditions where there is no scavenging to sufficient accuracy to know whether or not a particular limit is observed.

In this respect, it is useful to note that the inner layers if separate will have a permeance to oxygen that will increase with time as the scavenging component of the composition is consumed. The time dependence of permeance of the layers, we believe, will in general be essentially as shown by the bold line in FIG. 1, in which the wall is formed at time $t=0$.

In the scavenging systems described in our copending applications we have sometimes observed that there may be a time delay between the formation of a wall and the full appearance of the scavenging effect. In these cases FIG. 1 for low times is modified essentially as shown by the dashed curve marked X in the figure.

The difference referred to in (iii) at any time $t^1$ is shown by $D^1$ in FIG. 1, where $P_W(t=\infty)$ is the value $P_W$ would have in the absence of scavenging.

The standard storage conditions in between $P_W$ measurements at different times for the purposes of determining $D^1$ are storage in air ($p=0.21$ atm) at 23° C. and 50% relative humidity, both surfaces of the wall being exposed. Storage is in the dark or conditions of illumination not appreciably contributing to oxygen-scavenging.

$P_W(t=\infty)$ may be determined in any one of several ways, or at least a lower limit put upon $P_W(t=\infty)$, as follows:

(I) The full form of the curve in FIG. 1 is determined experimentally. This is of course very time consuming if the oxygen-scavenging capacity of the wall is very high.

(II) A wall is prepared in which the scavenging is absent but which is otherwise very similar and its $P_W$ is measured. For instance, in catalysed scavenging systems it is often very reasonable to omit the catalyst and take $P_W$ measured in the absence of catalyst as $P_W(t=\infty)$ for the wall containing the catalyst.

(III) If scavenging appears fully only after a time delay, early measurements of $P_W$ put a lower limit on $P_W(t=\infty)$.

(IV) Oxygen-scavenging may be suppressed by cooling the wall and $P_W$ measured and adjusted to allow for the effect of changed temperature.

(V) Measurements of $P_W$ are made with an inert gas such as carbon dioxide, making due allowance for the difference between $P_W$ for that gas and for oxygen as observed in walls made of broadly similar non-scavenging materials.

In its simplest form the wall provided by the present invention comprises just two layers, i.e. a single layer on the outside and a single layer comprising the aforesaid composition on the inside. Other forms can be considered as modifications of the above. For instance, there may be a tie layer between the two layers just described (this tie layer then being the innermost layer of the outer set) and/or an additional layer on the inside of the layer comprising the composition. This additional layer (if necessary attached to the layer comprising the composition by a tie layer) may serve one or both of the following functions: it may separate the layer comprising the composition from the contents of the package (e.g. to avoid possible food contact problems); and it may serve as a heat sealing layer.

If the wall is rigid, as in the wall of a bottle, scavenging properties will decay during prolonged storage in air prior to filling, and such prolonged storage should preferably be avoided.

If the wall is flexible sheet or film, it is possible to roll it up so as to largely to prevent access to air and to unroll immediately prior to use. An analogous technique is applicable in principle to flat or otherwise stackable rigid walls.

Layers or the layer in the outer set referred to under (a) above advantageously comprise one or more suitably high-barrier polymers, metals, inorganic oxides such as silica or alumina, or carbon in graphitic or diamond form. High barrier polymers may be readily selected by the man skilled in the art from their reported permeabilities. Among numerous such polymers we may mention MXD6 (already referred to in another context as an oxidisable organic component), poly(vinylidene chloride), vinylidene chloride-vinyl chloride copolymers, and copolymers of ethylene and vinyl alcohol.

The composition referred to under (b) above is advantageously a composition as provided by UK patent application 88 15699.7 in its second aspect. Especially in order to achieve high differences as specified in (iii) above, a non-oxidisable polymer having a $P_M$ of at least 3.0, most especially at least 10, and above all at least 50 cm³ mm/(m² atm day) is suitable. Polyolefins are especially suitable, most particularly polyethylene (especially low-density polyethylene) and polypropylene. Oxidisable organic components and metal catalysts preferred are those described in GB 88 306175.6.

THE DRAWINGS

The present invention will now be further described, by way of illustration only, with reference to the attached Figures, of which FIG. 1 illustrates a plot of the time dependence of permeance.

DETAILED DESCRIPTION OF THE INVENTION

Figure 1:
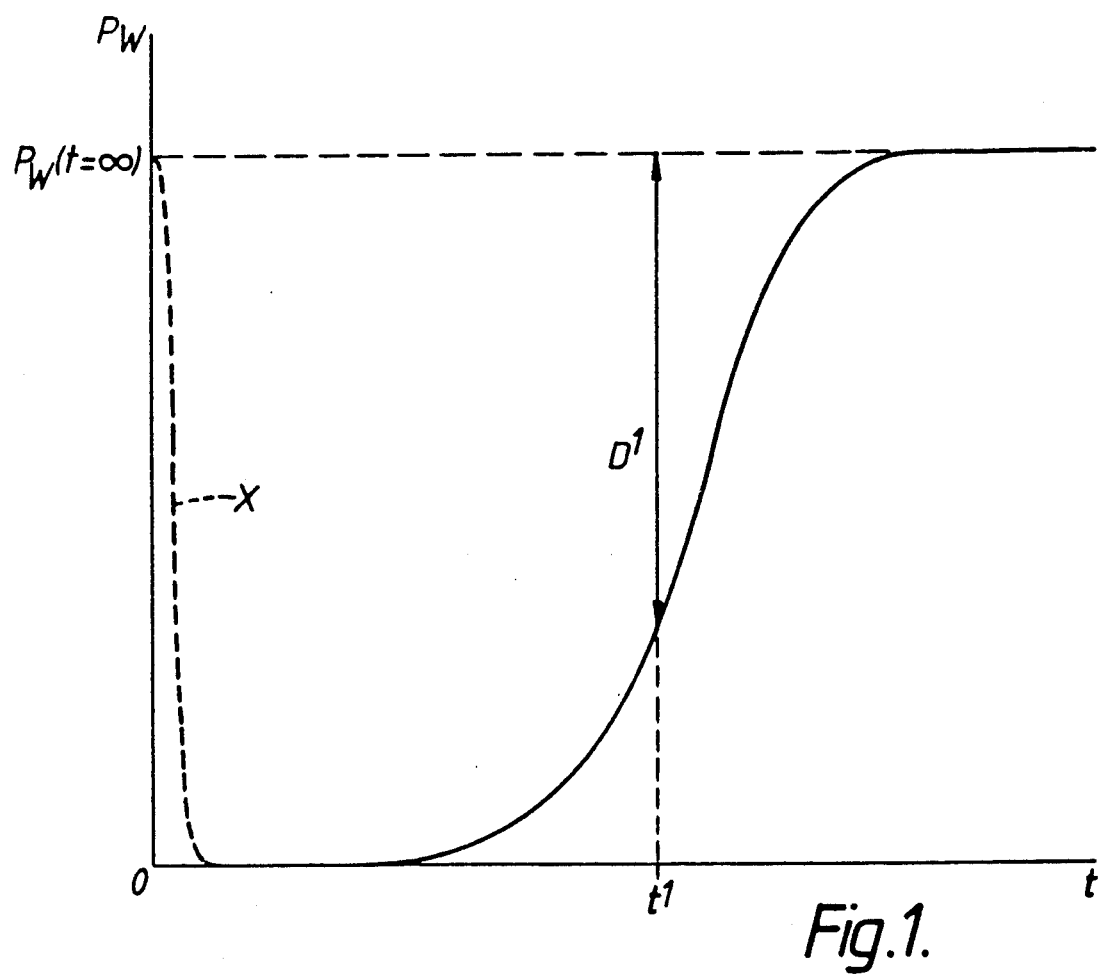
Figure 2:
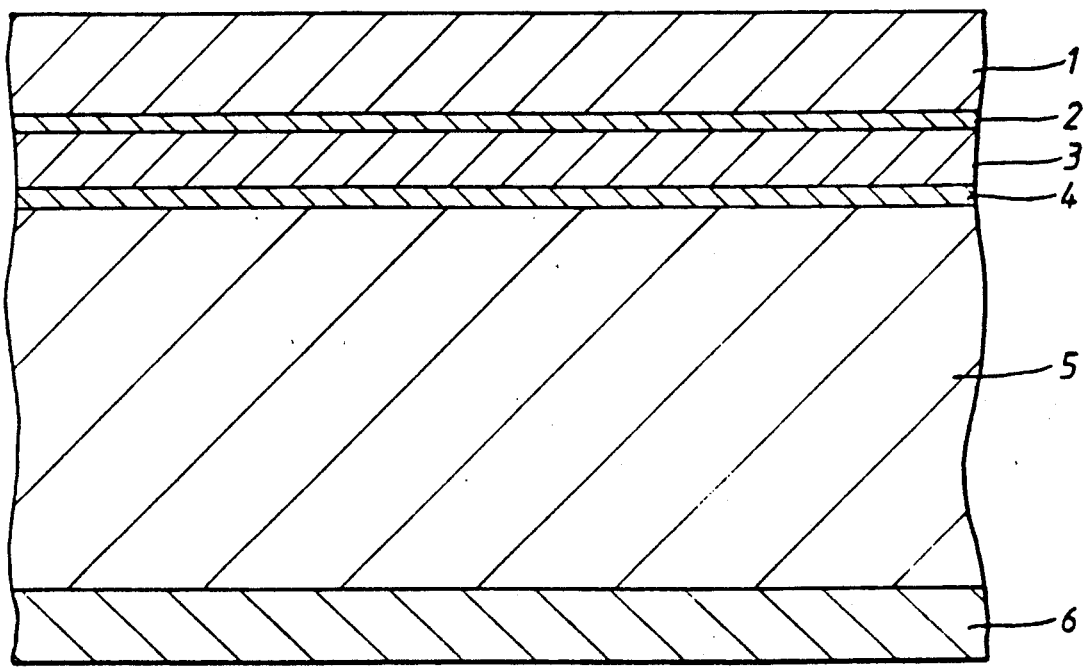
FIG. 2 shows in section a lidding material including a metal sheet according to the present invention.

In FIG. 2, 1 represents a layer of oriented polyethylene terephthalate 25 micrometer in thickness, 2 represents a layer of polyurethane adhesive 5 micrometer in thickness, 3 represents a layer of aluminium metal 15 micrometer in thickness, and 4 represents a layer of polyurethane adhesive 5 micrometer in thickness. 1 to 4 together constitute the outer set of layers of the wall.

5 represents a layer of thickness 100 micrometer of a composition consisting of MXD6 in a weight fraction of 10%, cobalt Siccatol in a weight fraction of 200 ppm expressed as metal, the balance being polypropylene. 6 represents a layer of polypropylene of thickness 20 micrometer. This serves as a heat seal layer, and also avoids direct contact of layer 5 with the package contents. 5 and 6 together constitute the inner set of layers of the wall, of which 5 is the outermost.

In a modification of the structure shown in FIG. 2, layer 3 of aluminium is 40 micrometer in thickness instead of 15 micrometer. While a thickness of 15 micrometer is indeed satisfactory if the layer is well made, use of a nominal thickness of 40 micrometer reduces the risk that pinholes will be present.

The permeance of the outer set of layers 1-4, for oxygen, is below the limit of detection on an OXTRAN machine (about 0.05 cm$^3$/(m$^2$ atm day)) essentially because of the aluminium layer 3.

In Example 10 of our copending patent application 88 15699.7 the permeance of a 1.5 mm wall containing 10% by weight of MXD6 and 90% by weight of polypropylene (without added cobalt) is given as 26 cm$^3$/(m$^2$ atm day). The literature value for pure polypropylene's permeability is 70 cm$^3$/(m$^2$ atm day). Accordingly, the permeance in the absence of scavenging of layer 5 can be calculated to be $$26 \times \frac{1.5}{0.1} = 390 \text{ cm}^3/(\text{m}^2 \text{ atm day})$$

and of layer 6

$$70 \times \frac{1000}{20} = 3500 \text{ cm}^3/(\text{m}^2 \text{ atm day}).$$

It follows that the permeance in the absence of scavenging of the inner set of layers 5 and 6 is $$\left(\frac{1}{390} + \frac{1}{3500}\right)^{-1} = 350 \text{ cm}^3/(\text{m}^2 \text{ atm day})$$

The scavenging in layer 5 reduces this permeance by more than 1 cm$^3$/(m$^2$ atm day) for more than 2 days.

The structure shown in FIG. 2 may be conveniently fabricated by the steps of
 (i) coextruding layers 5 and 6 together, and
 (ii) adhesive lamination of the 5/6 coextrusion with layers 1 and 3 by use of the polyurethane adhesive.

The preparation of the composition used in layer 5 is described in Example 10 of our copending patent application 88 15699.7.

Figure 3:
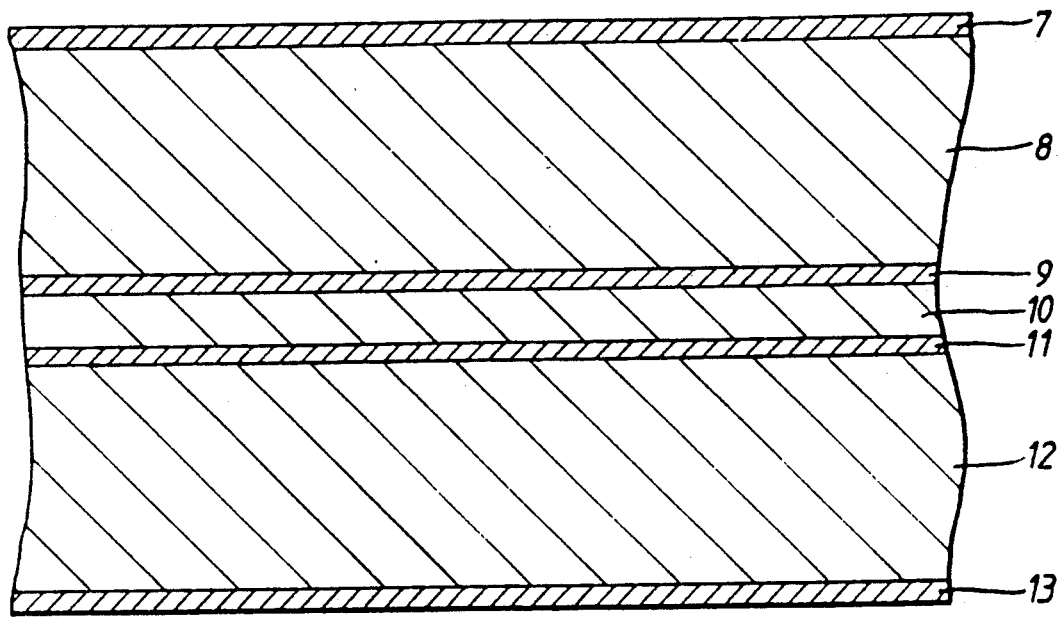
FIG. 3 shows a section through a wall of a polymer tray.

In FIG. 3, layer 7 is of polypropylene and of thickness 50 micrometer, layer 8 is a reclaim layer of thickness 600 micrometer, layer 9 is a tie layer of maleic anhydride—modified polypropylene of thickness 40 micrometer, layer 10 is a layer of a vinylidene chloride/vinyl chloride copolymer of thickness 150 micrometer, and layer 11 is a tie layer of maleic anhydride-modified polymer of thickness 40 micrometer. Layers 7 to 11 constitute the outer set of layers.

Layer 12 is 600 micrometer thick, has the same composition as layer 5 in FIG. 2, and is oxygen-scavenging Layer 13 is a polypropylene layer 50 micrometer thick. This serves the same heat seal and separation function as layer 6 in FIG. 2. Layers 12 and 13 together constitute the inner set of layers, of which layer 12 is the outermost.

The composition of the reclaim layer is, of course, a weighted average of that of the other layers.

The permeance of the outer set of layers 7 to 11 (ignoring any scavenging in the reclaim layer 8) can be calculated from permeabilities in the literature. By virtue of layer 10 alone, the material of which has a permeability of 0.06 cm$^3$mm/(atm m$^2$ day), this permeance is less than 0.4 cm$^3$/(m$^2$ atm day).

The permeance in the absence of scavenging of inner layers 12 and 13 separately and taken together can be computed as was done above with reference to FIG. 2. For layer 12 it is $$26 \times \frac{1.5}{0.6} = 65 \text{ cm}^3/(\text{m}^2 \text{ atm day}).$$

For layer 13 it is $$70 \times \frac{1000}{50} = 1400 \text{ cm}^3/(\text{m}^2 \text{ atm day})$$

For the outer layers 12 and 13 together it is $$\left(\frac{1}{65} + \frac{1}{1400}\right)^{-1} = 62 \text{ cm}^3/(\text{m}^2 \text{ atm day})$$

Scavenging in layer 12 reduces this permeance by more than 1 cm$^3$/(m$^2$ atm day) for more than 2 days.

The structure shown in FIG. 3 can be conveniently fabricated by coextrusion as sheet in a single step, followed by thermoforming (with some thickness reduction in parts) to afford the desired tray shape, and recycling the skeletal material.

Figure 4:
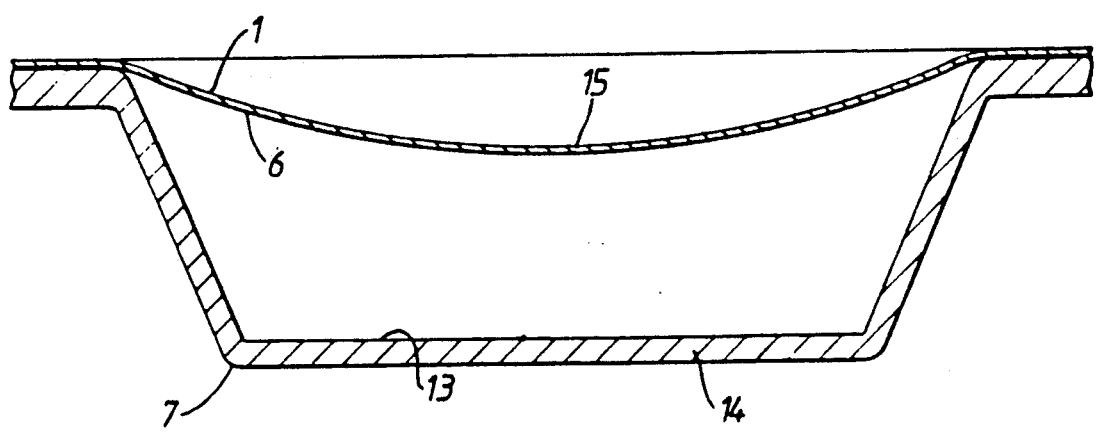
FIG. 4 shows in section a lidded tray in which the lidding material and the tray have the sections shown in FIGS. 2 and 3.

In FIG. 4 is shown, in schematic section, a tray 14 the wall of which has the section shown in FIG. 3, bearing a lid 15 heat-sealed thereon. The lid has the section shown in FIG. 2. In FIG. 4, the scale does not permit the layers within 14 and 15 to be shown; only the positions of the outermost and innermost layers are indicated.

Figure 5:
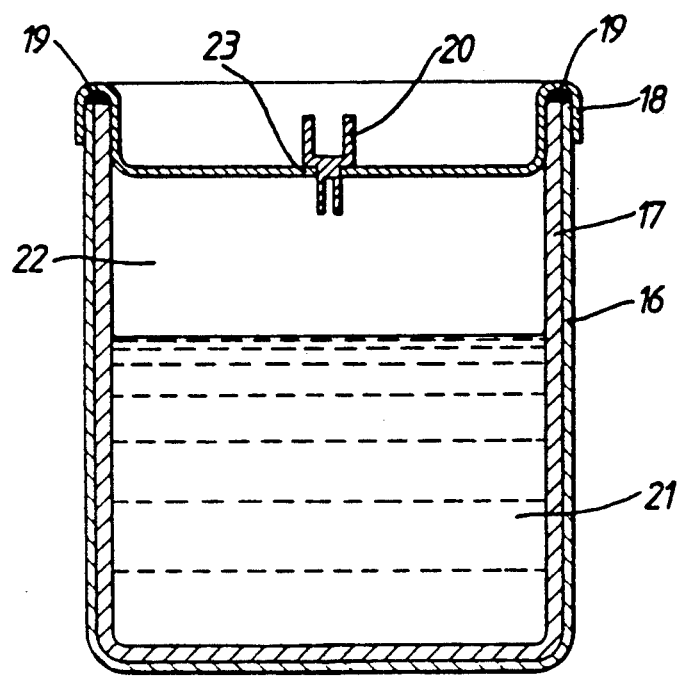
FIG. 5 shows, schematically and not to scale, in section an experimental container containing water and illustrating the principles of the present invention.

In FIG. 5, 16 represents an aluminium sheath enclosing an injection-moulded pot 17. To the top of the pot is clinched an aluminium beverage can end shell 18 having a central hole 23 which receives a rubber septum 20. 19 represents conventional sealing compound. The pot contains water 21 to simulate a food or beverage product. Septum 20 permits sampling the head space gas 22 at intervals.

The pot 17 was made as follows. Low-density polyethylene was mixed with MXD6 and a solution of cobalt (II) neodecanoate in a hydrocarbon solvent of low aromatic content with a boiling range at 760 mmHg of 155° C. to 173° C., and dried overnight in a dehumidifying air dryer. The mixture was then injection-moulded to form a cylindrical pot with a wall thickness of 1.5 mm, an outside diameter of 61 mm, and an external height of 70 mm. The weight fractions used were as follows: MXD6, 10 percent relative to the total composition; cobalt (expressed as metal), 500 ppm relative to the total composition; balance, polyethylene. The amount of solvent used was such that the weight fraction of cobalt (expressed as metal) was 5 percent relative to the solution.

The injection moulding machine was a Meiki 200. The materials used were as follows:
Low-density polyethylene
 Dutch State Mines grade Stamylan LD 2308A.
MXD6
 Grade Remy 6001 from Mitsubishi Gas Chemicals of Japan. This is a polymer of meta-xylylenediamine, H$_2$NCH$_2$-m-C$_6$H$_4$-CH$_2$, with adipic acid, HO$_2$(CH$_2$)$_4$CO$_2$H. The relative viscosity of the polyamide is 2.1, for a solution in 95% aqueous sulphuric acid containing 1 g of polymer per 100 cm³ of solution.

Cobalt (II) neodecanoate

Supplied by Shepherd Chemical Company, Cincinnati, Ohio.

Solvent

Isopar G supplied by Esso Chemical Ltd of Southampton, England.

The arrangement shown simulates a package containing a food or beverage product in accordance with the invention. 17 comprises the inner set of layers (in this case a single layer) and 16 the outer set of layers (in this case also a single layer). The permeance of the outer set of layers 16 is less than 0.05 cm³/(m²atm day) being of aluminium. The permeance of the inner set of layers 17 was measured directly on the OXTRAN machine on a similar pot not sheathed with aluminium. Very remarkably, it was less than 0.05 cm³/(m²atm day) both two days after fabrication of the pot and fourteen days after fabrication. In contrast a comparison pot identical except that no cobalt was present (i.e. in the absence of oxygen scavenging) had a permeance of 41 cm³/(m²atm day). This value is therefore the value specified in (ii) above, and the value specified in (iii) above is practically the same. Both a very high accessibility of the scavenger in layer 17 to headspace oxygen 22 and high scavenging power of layer 17 are strongly indicated.

Direct observation confirmed the performance in headspace scavenging resulting from these characteristics of layer 17. When the pot was filled with enough water to leave a headspace 22 of volume 50 cm³, the oxygen content fell from an initial 21 percent by volume relative to the headspace gas (initially air) to 8 percent after 7 days and 4.5 percent after 14 days.

All measurements and storage in the above were under the standard conditions referred to previously. The permeance measurements were performed on an OXTRAN machine 10/50A made by Mocon Inc. of U.S.A.

We claim:

1. A wall for a package comprising
   (a) an outer set of one or more layers; and
   (b) an inner set of one or more layers, which layer or the outermost of which layers comprises a composition comprising a synthetic polymer and having oxygen-scavenging properties,
   wherein
   (i) the outer set of layers would have, if separate from the inner set and in the absence of any oxygen-scavenging properties in any of the layers of the layer constituting the set, a permeance, for oxygen, of not more than 1.5 cm³/(m² atm day);
   (ii) the inner set of layers would have, if separate from the outer set and in the absence of oxygen-scavenging properties in any of the layers or the layer constituting the set, a permeance, for oxygen, of at least 2.0 cm³/(m² atm day);
   (iii) the inner set of layers would have, if separate from the outer set, a permeance, for oxygen, less than the permeance specified in (ii) by at least 1.0 cm³/(m² atm day) by virtue of oxygen-scavenging in at least the layer specified in (b); and
   (iv) the composition scavenges oxygen through the metal-promoted oxidation of an oxidisable organic component thereof.

2. A wall according to claim 1, wherein the oxidisable organic component includes one or more —CO—NH—groups in the molecule.

3. A wall according to claim 1, wherein the oxidisable organic component is a polymer.

4. A wall according to claim 1, wherein the oxidisable organic component is a polyamide.

5. A wall according to claim 1, wherein the oxidisable organic component is a polymer containing units of the formula

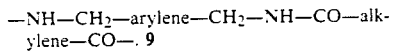
—NH—CH₂—arylene—CH₂—NH—CO—alkylene—CO—. 9

6. A wall according to claim 1, wherein the polymer specified in (b) above is a polymer of propylene.

7. A wall according to claim 1, wherein the polymer specified in (b) above is a polymer of ethylene.

8. A wall according to claim 1, shaped to receive a product to be packaged, wherein the side of the aforesaid inner set of layers is disposed on the side of the wall onto which the product is to be received.

9. A wall according to claim 1, which is a lidding material.

10. A wall according to claim 1, wherein the inner set of layers comprises at least two layers, the innermost of which is a heat-seal layer.

11. A package containing an oxygen-sensitive product and having a wall according to claim 1, the inner set of layers of the wall being disposed towards the product.

* * * * *